(12) United States Patent
Garcia-Juan et al.

(10) Patent No.: US 8,978,962 B2
(45) Date of Patent: Mar. 17, 2015

(54) FINE PARTICULATE FLUX

(75) Inventors: Placido Garcia-Juan, Hannover (DE); Hans-Walter Swidersky, Hannover (DE); Andreas Becker, Lachendorf (DE)

(73) Assignee: Solvay Fluor GmbH, Hannover (DE)

( * ) Notice: Subject to any disclaimer, the term of this patent is extended or adjusted under 35 U.S.C. 154(b) by 0 days.

(21) Appl. No.: 13/583,359

(22) PCT Filed: Mar. 8, 2011

(86) PCT No.: PCT/EP2011/053407
§ 371 (c)(1),
(2), (4) Date: Sep. 7, 2012

(87) PCT Pub. No.: WO2011/110532
PCT Pub. Date: Sep. 15, 2011

(65) Prior Publication Data
US 2013/0037172 A1 Feb. 14, 2013

(30) Foreign Application Priority Data
Mar. 11, 2010 (EP) .................................... 10156179

(51) Int. Cl.
*B23K 35/363* (2006.01)
*B32B 15/20* (2006.01)
*B23K 35/02* (2006.01)
*B23K 35/28* (2006.01)
*B23K 35/36* (2006.01)
*B23K 35/362* (2006.01)
*B23K 35/365* (2006.01)

(52) U.S. Cl.
CPC ......... *B23K 35/0244* (2013.01); *B23K 35/0238* (2013.01); *B23K 35/025* (2013.01); *B23K 35/286* (2013.01); *B23K 35/3605* (2013.01); *B23K 35/362* (2013.01); *B23K 35/365* (2013.01)
USPC .............................. 228/207; 228/223; 148/23

(58) Field of Classification Search
USPC .............................. 228/207, 208, 223; 148/23
See application file for complete search history.

(56) References Cited

U.S. PATENT DOCUMENTS

| | | | |
|---|---|---|---|
| 3,951,328 A | 4/1976 | Wallace et al. | |
| 3,971,501 A | 7/1976 | Cooke | |
| 4,428,920 A | 1/1984 | Willenberg et al. | |
| 4,556,165 A | 12/1985 | Yamawaki et al. | |
| 4,579,605 A | 4/1986 | Kawase et al. | |
| 4,670,067 A | 6/1987 | Suzuki et al. | |
| 4,689,092 A | 8/1987 | Suzuki et al. | |
| 5,100,048 A | 3/1992 | Timsit | |
| 5,422,191 A | 6/1995 | Childree | |
| 5,968,288 A | 10/1999 | Willenberg et al. | |
| 5,980,650 A | 11/1999 | Belt et al. | |
| 6,221,129 B1 | 4/2001 | Belt et al. | |
| 6,432,221 B1 * | 8/2002 | Seseke-Koyro et al. | ......... 148/24 |
| 6,648,212 B2 | 11/2003 | Seseke-Koyro et al. | |
| 6,720,465 B2 | 4/2004 | Braun et al. | |
| 6,743,409 B2 * | 6/2004 | Seseke-Koyro et al. | ...... 423/464 |
| 6,880,746 B2 | 4/2005 | Seseke-Koyro et al. | |
| 7,401,724 B2 * | 7/2008 | Swidersky et al. | ........... 228/207 |
| 2003/0071110 A1 | 4/2003 | Swidersky et al. | |
| 2004/0151655 A1 | 8/2004 | Seseke-Koyro et al. | |
| 2004/0164130 A1 | 8/2004 | Swidersky et al. | |
| 2007/0277908 A1 | 12/2007 | Seseke-Koyro et al. | |

FOREIGN PATENT DOCUMENTS

| | | | |
|---|---|---|---|
| EP | 0091231 A1 | 10/1983 | |
| EP | 1287941 A1 | 3/2003 | |
| EP | 1808264 A1 | 7/2007 | |
| JP | 63177998 A | * 7/1988 | |
| WO | WO 2005092563 A2 | 10/2005 | |
| WO | WO 2007131993 A1 | 11/2007 | |
| WO | WO 2009127707 A1 | 10/2009 | |
| WO | WO 2009153312 A1 | 12/2009 | |
| WO | WO 2010060869 A1 | 6/2010 | |
| WO | WO 2011076667 A1 | 6/2011 | |

OTHER PUBLICATIONS

U.S. Appl. No. 12/999,297, filed Dec. 15, 2010, Andreas Becker, et al.
U.S. Appl. No. 13/516,840, filed Jun. 18, 2012, Alfred Ottman.

* cited by examiner

*Primary Examiner* — Devang R Patel

(57) ABSTRACT

A fine particulate flux, an aqueous flux preparation comprising this flux, a method for the manufacture of a coated part of aluminum, aluminum alloys, steel, copper or titanium using such flux, and a method for brazing parts of aluminum or aluminum alloys to parts of aluminum, aluminum alloys, steel, copper or titanium using such flux. The flux can be obtained by sieving, or it can be obtained by removing solids, e.g., in a cyclone, from the drying gases obtained when wet fluxes are dried, especially after their manufacture. Fine particulate flux increases the viscosity of flux preparations comprising the flux dispersed in water or an aqueous or liquid organic carrier.

19 Claims, No Drawings

FINE PARTICULATE FLUX

CROSS-REFERENCE TO RELATED APPLICATIONS

This application is a U.S. national stage entry under 35 U.S.C. §371 of International Application No. PCT/EP2011/053407 filed Mar. 8, 2011, which claims priority to European Application No. 10156179.3 filed on Mar. 11, 2010, the whole content of this application being herein incorporated by reference for all purposes.

TECHNICAL FIELD OF THE INVENTION

The present relates to fine particulate flux, an aqueous flux preparation comprising this flux and a method for brazing aluminum and aluminum alloys.

BACKGROUND OF THE INVENTION

It is well known in the art that the brazing of parts of aluminum or aluminum alloys with parts of aluminum, aluminum alloys, copper, steel or titanium can be performed utilizing a lot of different fluxes. A flux very suitable for the brazing of aluminum parts to parts made from aluminum, copper, steel or titanium is based on alkali metal fluoroaluminates. U.S. Pat. No. 6,743,409 describes an alkali metal fluorozincate flux for brazing of aluminum and aluminum alloys. In example 1, a $KZnF_3$ flux is prepared with an X50 value of 3.28 µm. A respective X10 value is not given. US patent application publications 2003/071110 and 2004/164130 disclose a flux suitable for dry fluxing. Table 2 describes a flux having an X(90.93) of 7.5 µm.

Fluxes suitable as brazing flux are commercially available, e.g., from Solvay Fluor GmbH, Hannover/Germany under the tradename Nocolok®.

Several methods are known to apply the flux on the surface of the parts to be brazed.

According to one method, fluxes are applied in dry form by means of electrostatic forces. Such a flux preferably has a certain amount of coarser particles for better pneumatic transport, and a certain amount of fine particles for good adhesion to the metal parts.

According to another method, fluxes are applied in wet form, i.e., in the form of a slurry, to the surface or surfaces. Here, the flux is dispersed in water, organic solvents or mixtures thereof and applied for example by spraying, painting, printing or by immersing the parts into a respective flux preparation. The term "slurry" corresponds to the term "suspension".

Flux preparations consisting simply of flux and solvent have the disadvantage that a part of the flux preparation often does not adhere strongly to the surface. Either this part is lost as waste, or it must be recycled.

Consequently, in wet applications, binders, for example, polyacrylate or polyurethane, can be applied to improve the adhesion, and thickeners, for example pectines or gelatin, can be applied to reduce the dropping off of the preparation from the parts to be brazed. Both binder and thickener are often organic compounds, and thus, the wet flux preparation contains organic matter which has to be removed prior to the brazing process.

Fluxes for aluminum brazing, including fluxes based on potassium fluoroaluminate, are often manufactured in precipitation reactions. Often, alumina is reacted with HF, provided in the form of hydrofluoric acid, and the resultant fluoroaluminum acid is reacted with a potassium salt, e.g., potassium lye. The precipitated potassium fluoroaluminate is then dried. During drying, potassium fluoroaluminate dust is recovered.

SUMMARY OF THE INVENTION

Objective of the present invention is to provide a flux with improved properties when applied for brazing. Another objective of the present invention is to provide a flux preparation with improved properties.

These objectives and other objectives are achieved by the present invention.

The flux for aluminum brazing of the present invention has an X10 value of >0 µm and lower than 1 µm, an X50 value of from 1 to 3 µm, and an X90 value of <7 µm. The term "flux for aluminum brazing" denotes fluxes which can be applied to braze parts made from aluminum or aluminum alloy to other parts made from aluminum or aluminum alloy, copper, steel or titanium. The term "aluminum alloy" denotes parts the aluminum content of which is equal to or greater than 95% by weight. In the context of the present invention, the term "comprising" includes the meaning "consisting of".

The particle sizes are determined by laser diffraction, for example in a HELOS® apparatus combined with a RODOS® disperser. A method to measure them is described in example 1.

The X10 value preferably is equal to or greater than 0.7 µm. The X10 value is preferably equal to or lower than 0.9 µm. The X50 value is preferably equal to or greater than 1.7 µm. The X50 is preferably equal to or lower than 2. The X90 value is preferably equal to or lower than 5 µm.

Fluxes are preferred which have an X10 which is equal to or greater than 0.7 µm and equal to or lower than 0.9 µm, an X50 which is equal to or greater than 1.7 µm, an X50 which is equal to or lower than 2, and an X90 which is equal to or lower than 5 µm.

The X99 value is preferably equal to or lower than 15 µm, more preferably, equal to or lower than 14 µm, especially preferably, equal to or lower than 13 µm.

DETAILED DESCRIPTION

The fluxes of the present invention can be manufactured by sieving. They also can be prepared by mixing sieved fractions in appropriate amounts. Alternatively, they can be recovered from dust-removing apparatus, e.g., from filters or cyclones used to remove dust during drying of fluxes obtained by wet precipitation. It is known that potassium fluoroaluminates can be manufactured from $HAlF_4$ obtained from HF and $Al(OH)_3$, and KOH. This is described for example in U.S. Pat. No. 4,428,920, U.S. Pat. No. 4,579,605 and U.S. Pat. No. 5,968,288. The precipitated fluoroaluminates are dried before storage and dust is advantageously removed from the moist air originating from the drying process. A highly suitable dust-removing apparatus is a cyclone.

The flux of the present invention can be any type of flux for aluminum brazing.

Generally, fluxes for aluminum brazing are known; they are generally considered to be noncorrosive. For example, the brazing flux of the present invention is a potassium fluoroaluminate flux. Such fluxes are generically described, see for example, U.S. Pat. Nos. 3,951,328, 4,579,605 or 6,221,129, or U.S. Pat. No. 3,971,501 which describes a flux based on $KAlF_4$ and $K_3AlF_6$. U.S. Pat. Nos. 4,670,067 and 4,689,092 describe a flux based on potassium fluoroaluminate and cesium fluoroaluminate. Those cesium-containing basic fluxes are especially suitable to braze aluminum-magnesium alloys.

The flux of the present invention can also be an alkali metal fluorozincate flux, especially a potassium fluorozincate basic flux, can be used. Such basic fluxes are disclosed, for example, in U.S. Pat. Nos. 432,221 and 6,743,409. The flux of the present invention can also be a fluorostannate flux. A flux based on alkali metal fluorostannates is described in U.S. Pat. No. 6,880,746. The flux may also contain or consist of irreversibly dehydrated $K_2AlF_5$. This specific phase of $K_2AlF_5$ (hereafter often denoted "phase II salt") and its manufacture is described in U.S. Pat. No. 5,980,650. By heating $K_2AlF_5.H_2O$ to 90 to 265° C., a reversibly dehydrated $K_2AlF_5$ phase is obtained which is hereafter often called "phase I salt". By heating $K_2AlF_5.H_2O$ or the phase I salt to temperatures above about 265° C., the irreversibly dehydrated $K_2AlF_5$, the phase II salt, is formed. Under quasi-isobaric conditions, the phase II salt is even formed at temperatures as low as 228° C. While the formation of the phase II salt starts at the relatively low temperatures mentioned above, it is preferred to heat $K_2AlF_5.H_2O$ or the phase I salt to temperatures equal to or above 375° C. Brittle crystals form, and the conversion to the phase II salt is high. It is even possible to heat the starting material to a temperature up to or even higher than 500° C.

The flux of the present invention is optionally contained in a flux which comprises the fine particulate flux and additionally other fluxes of the prior art, especially those described above, with differing X10, X50 and X90 values; generally, these additional fluxes have X10, X50 and X90 values which are greater than those of the flux of the present invention. Preferably, the amount of the flux of the present invention is equal to or greater than 50% by weight of the sum of fluxes set as 100% by weight.

Optionally, the flux of the present invention further comprises a liquid carrier or additives which facilitate the brazing process or improve the properties of the brazed parts, for example, a liquid carrier, a binder, a thickener, a solder or a solder precursor or anticorrosive additives. A flux further comprising an additive is sometimes denoted as "flux preparation" in the following.

Additives which facilitate the brazing process are, for example, solder metal, for example, aluminum-silicon alloy, or solder metal precursors, e.g., silicon, germanium, copper or potassium hexafluorosilicate or cesium hexafluorosilicate; the hexafluorosilicates are also useful as basic fluxes. Brazing may be easier with a flux containing these additives because it is not necessary to clad the parts to be brazed with solder metal in a separate step. If present, these additives are preferably contained in an amount equal to or lower than 50% by weight of the total weight of the additives plus the flux. Preferably, the basic flux contains or consists of at least one compound selected from the group consisting of $KAlF_4$, $K_2AlF_5$, $CsAlF_4$, preferably, the flux is selected from the group consisting of $KAlF_4$, $K_2AlF_5$, $KAlF_5.H_2O$, $CsAlF_4$, $Cs_2AlF_5$, $Cs_3AlF_6$, $KCs_2Al_3F_{12}$, and mixtures thereof.

A basic flux comprising potassium fluoroaluminate and lithium fluoride as additive is known from EP-A-0 091 231. It is stated that the content of LiF should not fall short of 2% by weight and not exceed 7% by weight.

The use of solder metal precursors as additives is described in U.S. Pat. No. 5,100,048; the use of hexafluorosilicates as additives or flux is described in U.S. Pat. No. 6,648,212.

Other additives improve the properties of the brazed parts.

A basic flux comprising Li compounds as additive, especially $Li_3AlF_6$, is described in unpublished international patent application PCT/EP2009/065566. Lithium-fluoro compounds are especially suitable, preferably selected from the group consisting of LiF, $K_2LiAlF_6$ and $Li_3AlF_6$, and especially LiF and $Li_3AlF_6$. The content of $Li^+$ is preferably equal to or greater than 0.1% by weight which corresponds to a content of about 1% by weight (exactly: 0.77% by weight) of $Li_3AlF_6$ in the modified flux. Generally, the content of $Li^+$ in that flux is equal to or lower than 4.6% by weight. This corresponds to a content of about 36% by weight of $Li_3AlF_6$ in that flux. The Li salt additives improve the resistance of the brazed parts against corrosion.

Other additives which are optionally added to the flux are the metal salts disclosed in WO2005/092563. The additives described therein, especially the oxides and fluorides of lanthanum, cerium, niobium, bismuth, zirconium, titanium, improve the surface properties, e.g., provide a higher smoothness, and also improve the solder flow during brazing. If present, these additives preferably are contained in an amount of equal to or lower than 10% by weight of the total weight of the flux.

Preferably, the flux is a potassium fluoroaluminate flux containing about 75 to 85% by weight of $KAlF_4$ and 15 to 25% by weight of $K_2AlF_5$ or its hydrate.

Preferably, the flux consists of the fine particles so that the conditions given above for the X10, X50, and X90 values are met. The values for X99 given above are preferably met, too.

The fine particulate flux according to the present invention, optionally containing one or more additives as explained in detail above, is useful for any method of being applied to the parts to be brazed. The flux of the present invention can, for example, be applied in a dry method, e.g., it can be coated on the part to be brazed electrostatically. The fine particulate flux of the present invention can also be applied in a wet method wherein the flux and any additive, if present, being dispersed in an organic carrier to form a flux slurry. The organic carrier is e.g., a monobasic alcohol, for example, ethanol or isopropanol, or a dibasic alcohol, for example, glycol. The dispersion can be sprayed on the parts, painted on the parts, or be applied by immersing the parts into the slurry preparation.

The flux of the present invention is preferably applied in a wet method in the form of a flux preparation wherein the flux and any additive, if present, are dispersed in a carrier. Preferably, the carrier is water, an aqueous composition or an organic liquid. The term "aqueous composition" denotes mixtures of water and organic liquids miscible with water, e.g., alcohols or ketones.

Preferably, the flux preparation is an aqueous flux slurry, a flux paste or a flux preparation comprising a binder, especially for pre-fluxing.

According to one embodiment, the flux preparation is an aqueous flux slurry. The flux is dispersed in an aqueous carrier. The term "aqueous carrier" denotes a liquid carrier which consists of water or which is composed of water and an organic liquid as will be explained in detail below.

Consequently, a flux preparation comprising the flux according to the present invention and an aqueous carrier is another aspect of the present invention. The flux is preferably a potassium fluoroaluminate flux with the particle characteristics of X10, X50 and X90 and preferably also the X99 value indicated above.

According to one embodiment, the liquid carrier consists of water, e.g., de-ionized water, distilled water or tap water.

According to another embodiment, the aqueous carrier comprises water and an organic liquid which preferably is miscible with water. Preferably, in this embodiment, the content of water in the carrier is equal to or greater than 50% by weight, more preferably, equal to or greater than 80% by weight. The organic liquid is preferably selected from the group consisting of alcohols and ketones. In this embodiment, ethanol, n-propanol, isopropanol, glycols, e.g., ethylene glycol, propylene glycol and diethylene glycol are preferred alcohols, and acetone is the preferred ketone.

The aqueous carrier preferably consists of water.

Preferably, the aqueous flux preparation contains at least 15% by weight of the fine particulate flux of the present invention.

More preferably, the flux preparation contains equal to or greater than 30% by weight of the particulate flux of the invention, and especially preferably, the content is equal to or greater than 40% by weight of the total aqueous flux preparation. The content of the fine particulate flux of the present invention in the aqueous flux preparations is preferably equal to or lower then 80% by weight of the total aqueous flux preparation. Preferably, it is equal to or lower than 70% by weight.

The advantage of the fine particulate flux of the present invention is that it can be present in the slurry (dispersion) in concentration which is higher than in slurries (dispersions) with fluxes of coarser particle size. E.g., the flux is present in a concentration of equal to or more than 50% by weight, relative to the total weight of the slurry. The resulting slurry has a higher viscosity than observed in flux slurries with fluxes having a coarser particle size. The drop-off of the slurry from the coated parts is thus advantageously reduced.

According to an alternative embodiment, the flux is contained in a flux paste. Flux pastes are very viscous. The fine particulate flux of the present invention is contained in it in an amount equal to or greater than 20% by weight, preferably equal to or greater than 30% by weight of the total flux preparation. Preferably, the content of the fine particulate flux of the present invention in the paste is equal to or lower than 70% by weight of the total flux preparation. Flux pastes containing the fine particulate flux of the present invention in a range of 40 to 60% by weight of the total flux preparation. The carriers of pastes are often organic liquids. Preferred carriers in pastes are glycols, especially ethylene glycol and dipropylene glycol; mineral-oil products and their derivatives or alcohols, especially 2-propanol.

According to still another embodiment, the flux preparation is an aqueous preparation in the form of a suspension comprising or consisting of a flux, water and a binder. This flux preparation can be used for any wet application of the flux, and preferably, it is used for pre-fluxing. In this flux preparation, the fine particulate flux of the present invention is preferably contained in an amount equal to greater than 20% by weight of the total weight of the flux preparation. Preferably, the content of the fine particulate flux is equal to or lower than 50% by weight of the total flux preparation. The binder is preferably contained in an amount of equal to or greater than 0.1% by weight, more preferably, 1% by weight of the total flux preparation. Preferably, the content of binder is equal to or lower than 30% by weight, preferably equal to or lower than 25% by weight, of the total flux preparation. The balance to 100% by weight is an aqueous carrier consisting of water or containing water and a water-miscible organic liquid as defined above. Preferably, the aqueous carrier consists essentially of water also in this embodiment.

The aqueous slurry (or, in other words, the aqueous suspension), paste or binder-containing flux preparation optionally contains additives which facilitate the brazing process or improve the brazed parts. For example, the additives mentioned above which facilitate the brazing process or the properties of the brazed parts can be present in the flux preparation. For example, the flux preparation may contain Si powder, preferably in an amount of 2 to 20% by weight, and/or a lithium-fluoro compound, for example, LiF, $K_2LiAlF_6$ or $K_3AlF_6$, preferably LiF or $Li_3AlF_6$, and as especially preferred lithium-fluoro compound, $Li_3AlF_6$, in an amount of 0.5 to 15% by weight of the additive-containing flux preparation. A preferred amount of the Li compound corresponds to 0.8 to 1.2 times the amount needed to convert all $K_2AlF_5$ after brazing into $K_2LiAlF_6$. Water and, if present, other additives, for example, binder, thickener or surfactants are the balance to 100% by weight. The flux in these aqueous suspensions is preferably selected from the group consisting of $KAlF_4$, $K_2AlF_5$, $KAlF_5.H_2O$, $CsAlF_4$, $Cs_2AlF_5$, $Cs_3AlF_6$, $KCs_2Al_3F_{12}$, potassium fluorozincate, cesium fluorozincate, potassium fluorostannate, and cesium fluorostannate, and mixtures thereof; more preferably, it is selected from the group consisting of $KAlF_4$, $K_2AlF_5$, $KAlF_5.H_2O$, $Cs_2AlF_4$, $Cs_2AlF_5$, $Cs_3AlF_6$, $KCs_2Al_3F_{12}$, and mixtures thereof; and most preferably, it is selected from the group consisting of $KAlF_4$, $K_2AlF_5$ and mixtures thereof.

In one embodiment, the aqueous flux suspension comprises preferably 20 to 40% by weight of the before-mentioned flux. Here, the suspension especially preferably consists of said flux and water which is the balance to 100% by weight.

In another preferred embodiment, the aqueous flux suspension comprises the flux and it further comprises 10 to 20% by weight of an organic binder. In an especially preferred embodiment, the aqueous flux suspension consists of at least one of the before-mentioned fluxes, water and binder. The amount of flux is preferably 20 to 40% by weight, the amount of binder is preferably 10 to 20% by weight, and water is the balance to 100% by weight. Suitable binders are mentioned below. The flux preferably is a potassium fluoroaluminate flux as outlined above.

Suitable binders are known to the man skilled in the art. Preferred binders are selected from the group consisting of organic polymers. Such polymers are physically drying (i.e., they form a solid coating after the liquid is removed), or they are chemically drying (they may form a solid coating e.g., under the influence of chemicals, e.g., oxygen or light which causes a cross linking of the molecules), or both. Preferred organic polymers are selected from the group consisting of polyolefins, e.g., butyl rubbers, polyurethanes, resins, phthalates, polyacrylates, polymethacrylates, vinyl resins, epoxy resins, nitrocellulose, polyvinyl acetates and polyvinyl alcohols. The binder can be water-soluble or water-insoluble. The binder preferably is dispersed in the carrier. Polyacrylates, polymethacrylates, polyvinyl alcohols and polyurethanes are preferred binders in the present invention.

In still another embodiment of the present invention, the flux preparation comprises the flux, water, a binder, a thickener and optionally additives which facilitate the brazing process or improve the brazed parts. The thickener may also provide the flux preparation with thixotropic properties. A wax as described in EP-A 1808264, methyl butyl ether, gelatin, pectin, acrylates or polyurethane, as described in EP-A-1 287941, are preferred thickeners if a thickener is applied.

Preferably, the flux preparation does not contain a thickener.

The flux preparation may include other additives for example, suspension stabilizers, surfactants, especially non-ionic surfactants, e.g., Antarox® BL 225, a mixture of linear C8 to C10 ethoxylated and propoxylated alcohols.

The dynamic shear viscosity at a shear rate of 172 $s^{-1}$, of the preparations of the invention comprising flux, water and binder is preferably equal to or greater than 8 mP·s, when measured at 23° C. with a preparation comprising 30% by weight of the flux, 15% by weight of the binder and the balance to 100% by weight being water; the dynamic shear viscosity at a shear rate of 172 s$^{-1}$, of the preparations of the invention comprising flux, water and binder is preferably equal to or greater than 80 mP·s, when measured with a preparation comprising 35% by weight of the flux, 15% by weight of the binder and the balance to 100% by weight being water, and more preferably, with such a composition, the dynamic shear viscosity at 172 s$^{-1}$ is equal to or greater than 100 mP·s. The dynamic shear viscosity at a shear rate of 3000 s$^{-1}$, of the preparations of the invention comprising flux, water and binder is preferably equal to or greater than 8 mP·s when measured at 23° C. with a preparation comprising 30% by weight of the flux, 15% by weight of the binder and the balance to 100% by weight being water; the dynamic shear viscosity at a shear rate of 3000 s$^{-1}$ of the preparations of the invention comprising flux, water and binder is preferably equal to or greater than 11 mP·s when measured at 23° C. with a preparation comprising 35% by weight of the flux, 15% by weight of the binder and the balance to 100% by weight being water, and more preferably, the dynamic shear viscosity of the latter flux preparation at 172 s$^{-1}$ is equal to or greater than 12 mP·s, and especially preferably, is equal to or greater than 15 mP·s. The dynamic shear viscosity can for example be measured using a Rheolab® MC1 rotation viscosimeter.

The dynamic shear viscosity mentioned in the paragraph above is measured preferably for aqueous suspensions which had been prepared with a dissolver operating at a speed of approximately 800 min$^{-1}$.

The flux preparations of the invention are preferably prepared as follows.

Flux and carrier are given into a vessel. In this vessel, the flux is dispersed in the carrier in a dispersing step. Any solid additives, e.g., Si powder or Li$_3$AlF$_6$, or binder are preferably added before performing the dispersing step.

It was observed that the flux preparations comprising the fine particulate flux provide an aqueous flux preparation with higher viscosity. The viscosity is especially high in flux preparations comprising equal to or more than 40% by weight of the fine-particulate flux.

The flux preparations, especially according to the embodiment where a binder is contained, are very suitable for a method of pre-fluxing parts intended for brazing. In this pre-fluxing method, the parts of aluminum or aluminum alloy and/or the parts made of steel, copper or titanium which are to be brazed are coated with the carrier-containing flux preparation and dried. The parts, which can for example be fins or tubes to be assembled to form a heat exchanger, or coils intended to be transformed to fins or tubes, can then be stored, if desired for a long time before brazing, or be transported to the site of use. The flux coating obtained by applying the flux preparation of the invention adheres very well to the surface of the parts. Pre-fluxed parts comprising the flux preparation of the present invention after removal of the carrier are another aspect of the present invention. The carrier can be removed by warming or heating the coated parts, preferably to a temperature higher than the boiling point of the carrier, or by applying a vacuum.

Consequently, a method for the manufacture of a coated part of aluminum or aluminum alloys, steel, copper or titanium wherein the flux is coated on the part and the part is dried to remove the carrier, is another aspect of the present invention. The flux optionally contains a liquid carrier or additives which facilitate the brazing process or improve the properties of the brazed parts, for example, a liquid carrier, a binder, a thickener, a solder or a solder precursor or anticorrosive additives. Preferred carriers and additives are given above.

Still another aspect of the present invention is a coated part of aluminum or aluminum alloys, steel, copper or titanium, obtained according to the process coating process.

Another aspect of the present invention is a process for brazing of parts of aluminum or aluminum alloys to parts of aluminum, aluminum alloys, steel, copper or titanium. The brazing process of the present invention comprises a brazing step wherein parts of aluminum or parts of aluminum alloy are joined to parts of aluminum, aluminum alloys, steel, copper or titanium wherein a flux is provided consisting of or comprising the fine-particulate flux of the present invention, preferably fine-particulate potassium fluoroaluminate flux, the flux is coated onto at least one of the parts to be joined, and the parts are heated in the presence of a solder or a solder precursor until a brazed joint has formed. An alternative brazing process provides for assembling parts made of aluminum or parts made of aluminum alloy are joined to parts made of aluminum, aluminum alloys, steel, copper or titanium wherein at least one of the parts to be joined by brazing was obtained according to the pre-fluxing method given above.

The brazing temperature is known to the expert. It depends mainly on the flux and the solder applied. For aluminum brazing using a potassium fluoroaluminate flux, the brazing is performed at a temperature at about 580 to 620° C. or higher.

In a preferred embodiment, the flux is applied in the form of a flux preparation selected from the group consisting of aqueous flux slurry, a flux paste or a binder-containing flux preparation, as described above.

The flux preparation is preferably applied to the part or parts to be brazed by spraying it onto the parts, by painting it onto the part or parts or by immersing the part or parts into the flux preparation.

The flux preparation is preferably applied in an amount such that the weight of the flux is about 3 to 40 g/m$^2$.

After brazing, the brazed parts can be subjected to a post treatment to improve the anticorrosive properties thereof. A method to improve the anticorrosive properties of brazed parts is described in international patent application WO 2009/127707. According to that patent application, the parts can be subjected to post treatment by heating them to between about 400° C. and 550° C. in an oxygen containing atmosphere, e.g., in air. Alternatively, or additionally, the brazed parts can be treated with a calcium salt as fluoride scavenger or with compounds which reduce the solubility of the flux residues. Potassium salts are highly suitable when a potassium containing flux was applied. Salts with AlF$_4$ ions, AlF$_5$ ions and AlF$_6$ ions are also suitable, e.g., the respective potassium salts.

The advantage of the present invention is that the fine-particulate flux provides flux preparations which have a higher viscosity than comparable other flux preparations. Thus, the adhesion to parts to be brazed is very good, the effectivity of the flux preparation is very high because there is less drop-off from the coated parts, the content of thickener can be reduced or even set to zero, and thus, the environmental compatibility is very high. The flux preparation allows for a thinner coating layer for pre-fluxing wherein the layers are very uniform. It can be used to provide pre-fluxed parts.

Another advantage is a better sedimentation behavior. The term "sedimentation behavior" denotes the property of a flux suspension in respect of settling of the solids. It is commonly determined by the remaining volume of the solid of the flux suspension after a certain time. It is often observed that solids of a suspension settle after some time, and sometimes it is difficult to re-suspend this settled solid. For determining the sedimentation behavior, a simple test is to transfer the respective suspensions into a measuring cylinder and to shake them thoroughly. The suspensions are then allowed to stand and settle. The inter-phase between clear solution and white solid is the sedimentation volume. The higher the sedimentation volume is, the better are its properties.

As is shown by comparison the present fluxes have an advantageous sedimentation behavior.

Should the disclosure of any patents, patent applications, and publications which are incorporated herein by reference conflict with the description of the present application to the extent that it may render a term unclear, the present description shall take precedence.

EXAMPLES

The following examples explain the invention in detail without the intention to limit it.

Example 1

Preparation of a Fine-Particulate Flux Consisting of $KAlF_4$ and $K_2AlF_5$ in a Weight Ratio of about 4:1

As described in U.S. Pat. No. 4,428,920, a flux is manufactured by reacting a tetrafluoroaluminum acid with a concentration of 21% by weight with potassium lye with a KOH concentration of 10% by weight at a temperature of about 80° C.; the F/Al ratio is about 4. The precipitated flux is filtered off from the reaction mixture and dried. The gases resulting from the drying operation are collected in a filter to remove fine particulate flux which is entrained in the gases. The fines in the filter have typically an X10 value of 0.7-0.9 μm, an X50 value of about 1.7-2.0 μm and an X90 value of <5 μm.

The values are measured in the following manner:

Used device: Sympatec HELOS® with powder dry-dispersion unit Rodos®.

Software version used for measurements: Sympatec HELOS® (device no. H1132) RODOS®: HRLD (V03.03. Rel.1) and Sympatec HELOS® (device no. H2068) RODOS®: HRLD (5.3.0.0). HRLD means high resolution laser diffraction.

Particle size distributions were measured by Laser Diffraction (method: Fraunhofer Approximation).

For the measurements a portion of the powder is dispersed in a stream of nitrogen gas by the means of a nozzle. The powder cloud then is passed perpendicular by a Laser-beam. The Laser-beam is diffracted by the powder particles within the powder cloud. The resulting diffraction angle and intensity distribution is dependant on the particle size and concentration of the particles (regarding particle size). The resulting diffraction pattern is detected by a light sensitive array detector. From the detected signal (diffraction pattern) the particle size distribution is subsequently calculated by a mathematical method called Fraunhofer approximation for round particles.

Example 2

Manufacture of an Aqueous Flux Slurry 200 g of the fine particulate flux of example 1 and 250 ml de-ionized water are mixed in a dissolver Disperlux Laboratorium DissolverModel 2027 Green-Line operated at a disk speed of 800 cycles per minute.

Example 3

Manufacture of a Flux Paste 200 g of the fine particulate flux of example 1 and 180 ml of glycol are mixed in the dissolver to yield a white paste.

Example 4

Manufacture of a Flux Paste Comprising $CsAlF_4$ 150 g of the fine particulate flux of example 1 and 5 g of cesium fluoroaluminate are mixed with 150 g of glycol in the dissolver to yield a whiter paste.

Example 5

Manufacture of a Flux Preparation Suitable for Prefluxing 65 g of a binder, 150 g of the fine particulate flux of example 1 and 225 ml de-ionized water are mixed in the dissolver.

Example 6

Manufacture of Coated Parts

The flux preparation of claim 5 is sprayed on heat exchanger sections in the form of fins and tubes of aluminum 3003, clad with Al—Si alloy, and the coated parts obtained hereby are dried in an oven at a temperature above 200° C. to evaporate the glycol contained. The resulting parts are cooled and removed from the oven. They can be stored.

After storage, fins and tubes are assembled to form a heat exchanger and are then brazed in an oven containing a nitrogen atmosphere. The brazing temperature is about 620° C. The brazed parts are taken out of the oven and cooled.

Example 7

Brazing with the Aqueous Flux Preparation of Example 2

An aluminum (AA3003) angle is placed on an aluminum coupon clad (plated) with aluminum-silicon alloy 4343, and the aqueous flux preparation of example 2, is painted on the assembly of coupon and angle. The flux load is about 10 g/m². The assembly is heated to about 615° C. and brazed.

Example 8

Brazing of Parts Made from Al—Mg Alloys

An aluminum angle made from an aluminum alloy containing magnesium, wherein the amount of magnesium is lower than 0.5% by weight of Mg, clad with Al—Si alloy, is placed on a clad aluminum alloy coupon which likewise contains magnesium, in an amount of lower than 0.5% by weight. The flux paste of example 4 is painted on the coupon/angle assembly. The flux load is about 20 g/m². The assembly is heated to about 620° C. and brazed.

Example 9

Brazing with Flux Paste of Example 2

Example 7 is repeated. The flux paste of example 2 is painted on the assembled parts. The parts are then heated to about 620° C. and brazed thereby.

Example 10

Determination of the Dynamic Shear Viscosity of Flux Powders and of their Sedimentation Behavior The following 4 fluxes were tested (all X values were determined by Laser diffraction in a HELOS® apparatus with RODOS® disperser):

Flux A: Nocolok®, a flux commercially available e.g., from Solvay Fluor GmbH, Hannover/Germany. It is a mixture of $KAlF_4$ and $K_2AlF_5$ in an approximate ratio of 4:1. It had an X10 of 0.81 μm, an X50 of 2.62 μm, an X90 of 8.31 μm, and an X99 of 31.87 μm. This flux was used for comparison; it is not a flux of the present invention.

Flux B: X10 of 0.74 μm, an X50 of 1.90 μm, an X90 of 4.66 μm, and an X99 of 11.94 μm.

Flux C: X10 of 0.79 μm, an X50 of 1.98 μm, an X90 of 4.91 μm, and an X99 of 12.30 μm.

Flux D: X10 of 0.79 μm, an X50 of 1.88 μm, an X90 of 4.39 μm, and an X99 of 9.92 μm.

Fluxes B, C and D were also a constituted of a mixture of $KAlF_4$ and $K_2AlF_5$ in an approximate ratio of 4:1 and were recovered from a filter dust from the manufacture of potassium fluoroaluminate by the reaction of KOH and $HAlF_4$, the latter obtained from the reaction of HF and $Al(OH)_3$.

The composition of flux suspensions that were tested:
1. A preparation consisting of 35% by weight of suspended flux powder, balance to 100% by weight was water; denoted in the table as "S1".
2. A preparation consisting of 35% by weight of suspended flux powder, 15% by weight of a water soluble binder composition (a viscous organic liquid, available as "Nocolok® Flux Precoating" from Solvay Fluor GmbH, Hannover/Germany), balance to 100% by weight was water; denoted in the table as "S2".
3. A preparation consisting of 35% by weight of suspended flux powder and 15% by weight of a suspended binder available from Solvay Fluor GmbH as "Nocolok® Binder", balance to 100% by weight being water; denoted in the table as "S3".

The viscosity was determined in a rotation viscosimeter Rheolab MC1, system MP31 (disc diameter 50 mm; shape flat 0; gap width 0.5 mm; measuring temperature 23.0° C.) with a shear rate of 172 $s^{-1}$ and 3000 $s^{-1}$. The results are compiled in table 1.

TABLE 1

| Dynamic shear viscosity of fluxes A to D (rounded up) | | | | | | | | | | | | |
|---|---|---|---|---|---|---|---|---|---|---|---|---|
| | Flux A (comparison) | | | Flux B | | | Flux C | | | Flux D | | |
| | S1 | S2 | S3 | S1 | S2 | S3 | S1 | S2 | S3 | S1 | S2 | S3 |
| Visc.* | 70 | 25 | 10 | 130 | 30 | 310 | 120 | 120 | 480 | 225 | 70 | 140 |
| Visc.** | 10 | 12 | 6 | 18 | 12 | 38 | 17 | 16 | 50 | 28 | 15 | 24 |

Visc = Viscosity [mP · s] at a shear rate of 172 $s^{-1}$
Visc = Viscosity [mP · s] at a shear rate of 3000 $s^{-1}$ The tests demonstrate the higher viscosity of the fluxes of the invention. A higher viscosity of flux preparations is advantageous in wet fluxing because the flux preparation adheres better to the item to be fluxed.

Determination of the Sedimentation Behavior:

100 ml of the respective suspensions were transferred into a measuring cylinder and shaken thoroughly. The suspensions were allowed to stand and settle. The inter-phase formed after 72 h between clear solution and white solid was recorded as sedimentation volume. The results are compiled in table 2.

TABLE 2

| Sedimentation behavior of fluxes A to D | | | | | | | | | | | | |
|---|---|---|---|---|---|---|---|---|---|---|---|---|
| | Flux A (comparison) | | | Flux B | | | Flux C | | | Flux D | | |
| | S1 | S2 | S3 | S1 | S2 | S3 | S1 | S2 | S3 | S1 | S2 | S3 |
| Sed. Vol.* | 81 | 73 | 54 | 92 | 71 | 83 | 92 | 73 | 78 | 95 | 75 | 72 |

*Sedimentation volume [ml]

The sedimentation volume of the fluxes of the invention is mostly superior to that of comparison flux A.

Example 11

Determination of the Dynamic Shear Viscosity of Flux Powders with a Flux Concentration of 30% by Weight in the Suspension The fluxes A, C and D of example 10 were used. The respective flux, a binder and water were transformed into a dispersion with a disperser operating at a speed of 800 $min^{-1}$ or 6500 $min^{-1}$. The composition of the dispersion was 30% by weight of flux, 15% by weight of binder, balance to 100% by weight being water. The dynamic shear viscosity was determined at a shear speed of 172 s$^{-1}$. The result is compiled in table 3.

TABLE 3

Dynamic shear viscosity of suspensions with a content of 30% by weight of flux at 23° C.

| | Flux A (comparison) | | Flux C | | Flux D | |
|---|---|---|---|---|---|---|
| | 800 min$^{-1}$ | 6500 min$^{-1}$ | 800 min$^{-1}$ | 6500 min$^{-1}$ | 800 min$^{-1}$ | 6500 min$^{-1}$ |
| Visc.* | 5.8 | 5.6 | 11 | 9.5 | 9 | 8.1 |
| Visc.** | 4.2 | 3.4 | 6.9 | 5.5 | 7.4 | 5.3 |

Visc = Viscosity [mP · s] at a shear rate of 172 s$^{-1}$
Visc = Viscosity [mP · s] at a shear rate of 3000 s$^{-1}$ This example demonstrates that the fluxes of the invention are superior in providing a higher dynamic shear viscosity, and that at a lower concentration there is an impact of the way of manufacture of the dispersion; if, for example, a disperser is used with a very high speed of the dispersing means, the viscosity is slightly lower compared to a much slower speed of the dispersing means. Accordingly, this provides for uniform properties of the dispersions produced even if the dispersion process may vary. It can also be noted when comparing the results of examples 10 and 11 that a flux content of 35% by weight gives much higher dynamic shear viscosity than a 30% by concentration.

Example 12

Brazing of Aluminum Parts with a Flux Comprising a Binder

A flux suspension is prepared by mixing Flux B of example 10 having an X10 of 0.74 μm, an X50 of 1.90 μm, an X90 of 4.66 μm, and an X99 of 11.94 μm and water such that the amount of the flux is 35% by weight. The suspension is then sprayed onto two aluminum parts clad with AlSi solder which are then assembled and brazed in an oven heated to approximately 610° C. under nitrogen atmosphere. The brazed parts are then taken out of the oven and cooled.

Example 13

Brazing of Aluminum Parts with a Flux Comprising a Binder

A flux suspension is prepared by dispersing Flux C of example 10 having an X10 of 0.79 μm, an X50 of 1.98 μm, an X90 of 4.91 μm, and an X99 of 12.30 μm, water and binder such that the amount of the flux is 35% by weight and the amount of binder is 15% by weight. The suspension is then sprayed onto two aluminum parts clad with AlSi solder which are then assembled and brazed in an oven heated to approximately 610° C. under nitrogen atmosphere. The brazed parts are then taken out of the oven and cooled.

Example 14

Brazing of Aluminum Parts with a Flux Comprising a Binder

A flux suspension is prepared by mixing Flux D of example 10 having an X10 of 0.79 μm, an X50 of 1.88 μm, an X90 of 4.39 μm, and an X99 of 9.92 μm, water and binder such that the amount of the flux is 35% by weight and the amount of binder is 15% by weight. The suspension is then sprayed onto two aluminum parts clad with AlSi solder which are then assembled and brazed in an oven heated to approximately 610° C. under nitrogen atmosphere. The brazed parts are then taken out of the oven and cooled.

The invention claimed is:

1. A flux preparation comprising a fine particulate flux for aluminum brazing having particles with size characteristics: an X10 equal to or greater than 0.7 μm and equal to or lower than 0.9 μm, an X50 equal to or greater than 1.7 μm and equal to or lower than 2 μm, and an X90 equal to or lower than 5 μm; and a carrier, wherein the carrier is water, an aqueous composition, or an organic liquid.

2. The flux preparation of claim 1, wherein the fine particulate flux is selected from the group consisting of KAlF$_4$, K$_2$AlF$_5$, KAlF$_5$.H$_2$O, CsAlF$_4$, Cs$_2$AlF$_5$, Cs$_3$AlF$_6$, KCs$_2$Al$_3$F$_{12}$, potassium fluorozincate, cesium fluorozincate, potassium fluorostannate, cesium fluorostannate, and mixtures thereof.

3. The flux preparation of claim 2, wherein the fine particulate flux is selected from the group consisting of KAlF$_4$, K$_2$AlF$_5$, KAlF$_5$.H$_2$O, CsAlF$_4$, Cs$_2$AlF$_5$, Cs$_3$AlF$_6$, KCs$_2$Al$_3$F$_{12}$, and mixtures thereof.

4. The flux preparation of claim 1, further comprising at least one additive selected from the group consisting of binder, thickener, solder, solder precursor, and anticorrosive additives.

5. The flux preparation of claim 4, comprising a binder, wherein the binder is an organic polymer selected from the group consisting of polyolefins, polyurethanes, resins, phthalates, polyacrylates, polymethacrylates, vinyl resins, epoxy resins, nitrocellulose, polyvinyl acetates, and polyvinyl alcohols.

6. The flux preparation of claim 1, further comprising a lithium-fluoro compound selected from the group consisting of LiF, K$_2$LiAlF$_6$ and Li$_3$AlF$_6$, as an anticorrosive additive.

7. The flux preparation of claim 1, being in the form of a slurry or a paste.

8. The flux preparation of claim 1, wherein the particles have an X99 value equal to or lower than 15 μm.

9. An aqueous flux suspension, comprising from 20 to 40% by weight of a fine particulate flux for aluminum brazing having particles with size characteristics: an X10 equal to or greater than 0.7 μm and equal to or lower than 0.9 μm, an X50 equal to or greater than 1.7 μm and equal to or lower than 2 μm, and an X90 equal to or lower than 5 μm, and further comprising a carrier, wherein said carrier is water or an aqueous carrier optionally comprising an organic liquid.

10. The aqueous flux suspension of claim 9, further comprising from 10 to 20% by weight of an organic binder.

11. The aqueous flux suspension of claim 9, having a dynamic shear viscosity of equal to or greater than 80 mP·s when measured at 23° C. at a shear rate of 172 s$^{-1}$ with a preparation comprising 35% by weight of said fine particulate flux.

12. A method for the manufacture of a coated part of aluminum or aluminum alloys, steel, copper or titanium wherein the flux preparation claim 1 is coated on the part and dried to remove the carrier.

13. A coated part of aluminum, aluminum alloys, steel, copper, or titanium, obtained according to the method of claim 12.

14. A method for brazing parts of aluminum or aluminum alloys to parts of aluminum, aluminum alloys, steel, copper or titanium, wherein the flux preparation of claim 1 or a flux suspension comprising a fine particulate flux for aluminum brazing having particles with size characteristics: an X10 equal to or greater than 0.7 μm and equal to or lower than 0.9 μm, an X50 equal to or greater than 1.7 μm and equal to or lower than 2 μm, and an X90 equal to or lower than 5 μm is coated on at least one part to be brazed, and wherein the parts to be brazed are assembled and are heated until a brazed joint has formed.

15. A method for brazing parts of aluminum or aluminum alloys to parts of aluminum, aluminum alloys, steel, copper, or titanium,
- wherein the flux preparation of claim 1 is coated on parts of aluminum, aluminum alloys, steel, copper, or titanium and dried to remove the carrier;
- wherein at least one of the coated parts is assembled with at least one other part of aluminum or aluminum alloys, steel, copper, or titanium; and
- wherein the assembly of parts is brazed, with the proviso that at least one of the parts to be brazed is of aluminum or aluminum alloy.

16. The aqueous flux suspension of claim 9, having a dynamic shear viscosity of equal to or greater than 8 mP·s when measured at 23° C. at a shear rate of 172 $s^{-1}$ with a preparation comprising 30% by weight of said fine particulate flux.

17. The flux preparation of claim 3, wherein the fine particulate flux is selected from the group consisting of $KAlF_4$, $K_2AlF_5$, and mixtures thereof.

18. The flux preparation of claim 1, consisting of from 20 to 40% by weight of the fine particulate flux.

19. The flux preparation of claim 1, comprising from 20 to 40% by weight of the fine particulate flux, from 10 to 20% by weight of a binder, and water as carrier being the balance to 100% by weight.

* * * * *